Oct. 17, 1967　　B. A. URBANICK　　3,347,305
DOOR CONSTRUCTION
Filed June 1, 1965　　2 Sheets-Sheet 1
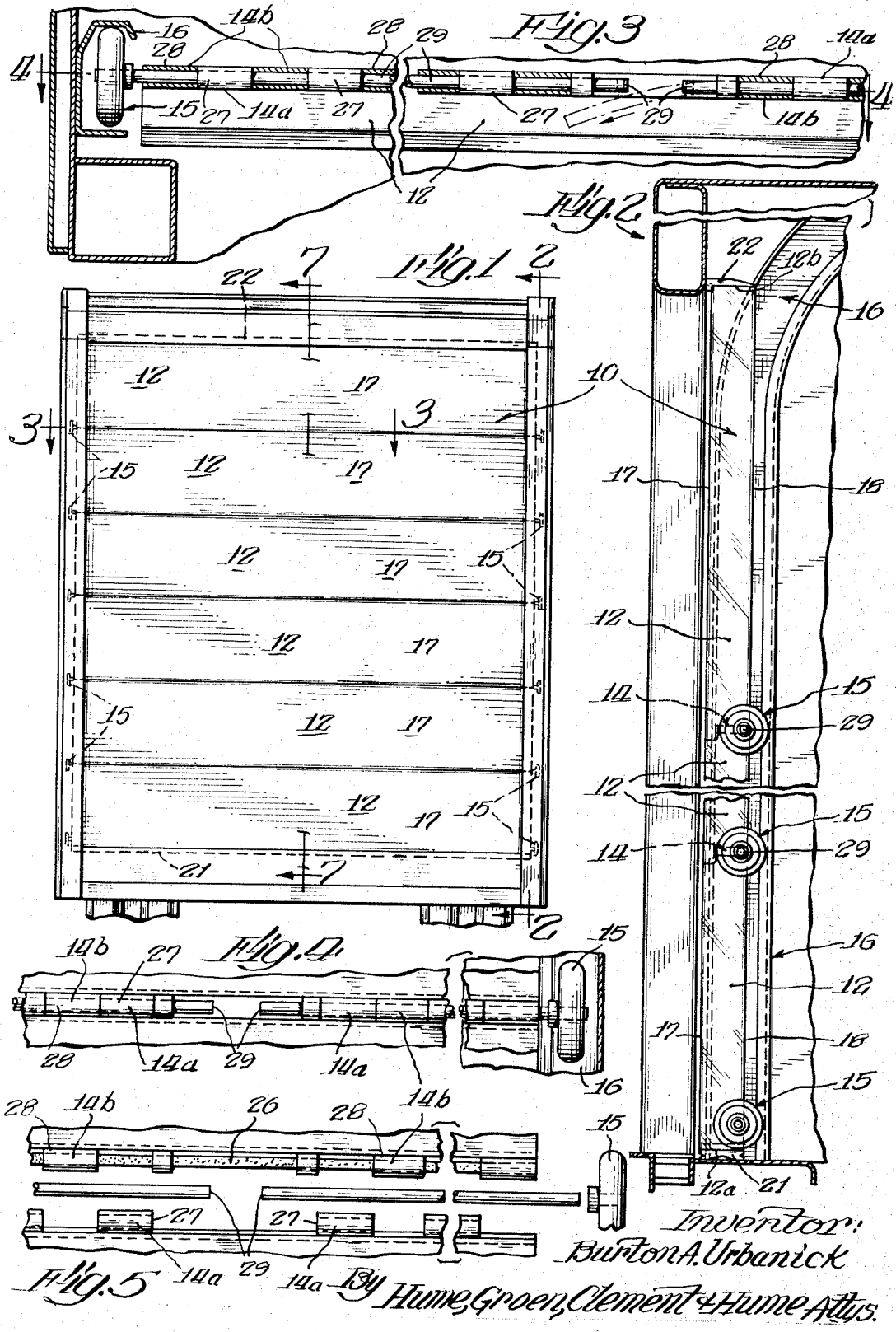
Inventor:
Burton A. Urbanick
By Hume, Groen, Clement & Hume Attys.

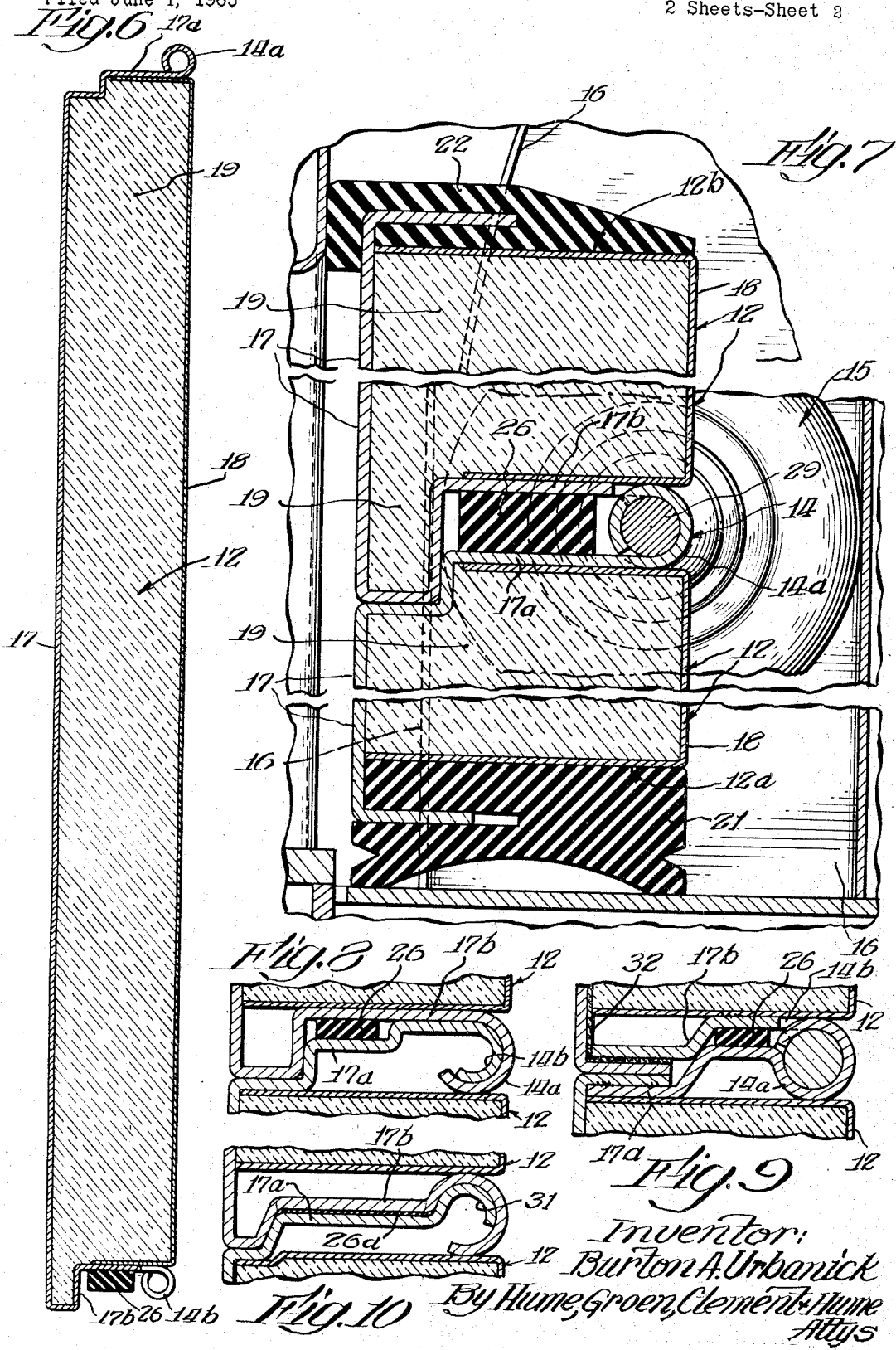

3,347,305
DOOR CONSTRUCTION
Burton A. Urbanick, Chicago, Ill., assignor to Met-L-Wood Corporation, Chicago, Ill., a corporation of Illinois
Filed June 1, 1965, Ser. No. 460,036
2 Claims. (Cl. 160—40)

The present invention relates to an overhead rollup door construction having a plurality of hinged sections.

It is an object of the present invention to provide an improved high strength, low weight, rollup door construction.

Another object of the invention is to provide an overhead, rollup door construction employing a plurality of light weight integrally hinged panels.

A further object of the present invention is to provide a lightweight rollup door which is particularly suitable for use on trucks and other vehicles. A more specific object of the invention is to provide a rollup door which is characterized by a substantially weatherproof and insulated, multipaneled construction wherein the panels are preferably integrally hinged, structurally stable laminated units.

Other objects and advantages of the invention will become apparent from the following description, particularly when considered in conjunction with the accompanying drawings wherein:

FIGURE 1 is a rear view of a trailer truck employing an embodiment of a rollup door constructed in accordance with the present invention;

FIGURE 2 is an enlarged, fragmentary cross sectional view taken along the line 2—2 in FIGURE 1;

FIGURE 3 is an enlarged, fragmentary cross sectional view of a panel hinge assembly taken along the line 3—3 in FIGURE 1;

FIGURE 4 is a cross sectional view taken generally along the line 4—4 in FIGURE 3;

FIGURE 5 is a view similar to FIGURE 4 but depicting the hinge assembly in disassembled form;

FIGURE 6 is a cross sectional view of one of the panels of the rollup door illustrated in FIGURE 1;

FIGURE 7 is an enlarged fragmentary view taken along the line 7—7 of FIGURE 1 and depicting one embodiment of a hinge assembly for the door of the present invention;

FIGURE 8 is a view similar to FIGURE 7, but depicting an alternate form of hinge assembly;

FIGURE 9 is a view illustrating still another form of hinge assembly; and

FIGURE 10 is a view similar to FIGURES 8 and 9 and depicting an additional form of hinge assembly suitable for the door construction of the present invention.

The present invention relates to a rigid yet lightweight rollup door preferably formed by a plurality of laminated stressed skin panels, each panel having thin outer metal surfaces that are joined to and confine a layer or layers of suitable reinforcing and/or insulating materials. The panels are hingedly secured to one another by recessed hinges which are formed by integral extensions of the outer metal surfaces.

Referring to the drawings, FIGURES 1 and 2 illustrate a rollup door 10 constructed in accordance with the present invention and which is particularly adapted for mounting as the rear door of a semi-trailer or similar vehicle as shown in the drawing. The rollup door 10 preferably includes a plurality of stressed skin, laminated panels 12 (FIGURE 6) that are secured to one another by recessed hinge assemblies 14. Suitable roller members 15 are preferably removably secured to the hinge assemblies so as to facilitate the travel of the door 10 on conventional curved tracks 16. If desired, the door may be counterweighted or counter-balanced by springs (not shown) to assist in lifting the door; however, the details of such features do not form a part of the present invention.

Considering the invention in further detail, the door 10 provides a smooth planar configuration both interiorly and exteriorly when the door is in a down or closed position. In this connection, the panels 12 abut one another and are joined in mating relationship by the recessed hinged assemblies 14 that are provided by the immediately adjacent panels. Preferably, the hinge assemblies 14 are formed as integral extensions (i.e. either continuous or added on) of either the exterior metallic, stressed skin 17 or the interior metallic, stressed skin 18, between which the insulating and/or reinforcing layers 19 are confined. As shown in FIGURES 2 and 7, the bottom edge 12a of the lower-most panel 12 is preferably provided with a conventional form of sealing gasket 21 to facilitate a substantially weathertight fit between the bottom edge of the closed door and the trailer floor. Correspondingly, the top edge 12b of the upper-most panel 12 preferably has a seal 22 extending longitudinally thereacross to provide a weathertight fit between the top edge of the closed door and the top of the doorway opening in the trailer.

Turning to FIGURE 6, the construction of a preferred form of stressed metallic skin laminated panel 12 is shown in cross section. This laminated construction provides high rigidity and structural strength, affords a weather resistent exterior surface, and is further characterized by a lightweight and low cost construction. More specifically, the preferred form of panel 12 has a so called "sandwich panel" construction. That is, the panel is formed with the thin outer stressed metallic skin 17 secured to the interval layer 19 by high strength adhesive bonding materials. In the embodiment shown in FIGURE 6, the upper and lower edge portions 17a and 17b of the outer skin 17 are overlapped about and joined to the upper and lower edge portions of the skin 18 and the layer 19 and are formed into hinge members 14a and 14b respectively.

The hinge members 14a and 14b are preferably constructed so as to form a "continuous" or "piano" hinge assembly. More specifically, and with reference to the embodiment depicted in FIGURES 3–5, the upper overlapped edge 17a of the outer metal skin 17 (i.e. including the members confined thereby) is formed with a reverse "Z-type" configuration which merges into the hinge member 14a inwardly of the plane of the skin 18. In a similar manner, the lower overlapped edge 17b of the outer metal skin 17 is formed with a similar irregularly shaped surface configuration that complements the upper surface of the immediately adjacent panel. As with the upper edge 17a, the complementary shaped edge 17b merges into the hinge member 14b inwardly of the plane of the skin 18. Moreover, the mating edge portions of the immediately adjacent panels are formed to accommodate a compressible sealing strip 26 (FIGURE 7) which is preferably secured to the upper overlapped edge 17a of each panel 12 adjacent the hinge member 14a. The sealing strip 26, which can be formed of rubber, plastic or a composition gasket material, is preferably selected with a thickness that insures that the strip is intimately compressed between the mating surfaces of adjacent panels when the door is in the closed position (e.g. FIGURE 7).

In the embodiment illustrated in FIGURES 3–5, the hinged members 14a and 14b are preformed so that a plurality of mating hinge eyes 27 and 28 are provided by these hinge members. In this connection and as shown particularly in FIGURE 5, the hinge eyes 27 and 28 are formed of the same length and are staggered with respect to each other so that these members on immediately adjacent panels can be readily brought into mating engagement to define the major portion of a hinge assembly 14. The hinge eyes 27 and 28 are joined together by a pair of hinge pins 29, which extend outwardly from the hinge assemblies and serve the dual function of removably supporting the roller members 15.

While it will be appreciated that a single hinge pin can be employed in various forms of rollup door constructions, it is preferable to utilize the dual functioning, multiple hinge pin arrangement as described above so that the door 10 or selected panels thereof are readily removable from a vehicle when the occasion arises. To facilitate this removal, portions of the hinge eyes 27 and 28 near the central portion of each pair of merging panels are cut away adjacent the interior surface of the door (i.e. FIGURES 3, 4 and 5) to allow access to the free ends of the hinge pins 29. With this arrangement, the free ends of the hinge pins can be grasped and withdrawn from engagement with the roller members 15, which are fitted on the opposite end of the hinge pin, thereby allowing the entire door or selected panels 12 to be easily disassembled. Only so much of selected ones of the hinge eyes 27 and 28 are cut away to allow for the easy withdrawal of the free ends of the pins as shown in dotted outline in FIGURE 3 and, if desired, a removable fastener (not shown) can be employed to join the free end of each hinge pin 29 to the remaining portion of the partially cut-away hinge eyes 27 and 28.

In accordance with the present invention, the inner and outer stressed skins 17 and 18 are preferably formed from relatively thin metallic sheets. For example, 18 gauge zinc coated steel and .05" aluminum are suitable materials for this purpose. The core material or layer 19 can be fabricated from any number of commercially available thermal insulations, plywood, honeycomb and other composite board materials, preferably a relatively rigid non-resilient type. In this latter connection, the thickness of the layer 19 dictates in part the rigidity of the panels 12, it being understood that the layer 19 is sufficiently thick so that the integral hinge assemblies 14 are fully recessed and the planar inner surface of the door 10 is free from undesirable projections. In instances where it is anticipated that the door will be subjected to unusually severe treatment (e.g. severe blows from transported products) it may be desirable to bond a plywood layer between one surface of the insulating layer 19 and inner metallic skin surface 18.

FIGURES 8–10 depict several alternate forms of hinge assemblies that can be utilized in rollup doors constructed in accordance with the present invention. However, before proceeding with a detailed description of these alternate forms of hinge assemblies 14, several general observations should be made regarding various other features of the rollup door 10. In this connection, it will be readily apparent to those skilled in the art that the mating upper and lower surfaces of adjacent panels 12 might be constructed with a variety of configurations. For example, the edge portions which define the integral hinge members 14a and 14b can be complementing arcuate surfaces that intimately mate when the door 10 is in the closed position and which readily accommodate the sealing strip 26 therebetween so as to insure a weathertight seal between adjacent panels 12.

Similarly, it will be understood that the interior skin 18 for the panels 12 need not be fabricated of a metallic material although this construction is preferable for the exterior skin 17. In this regard, it is desirable to employ laminated structural panels 12 of the type sold under the trademark Met-L-Wood with the skin surfaces of the panels being modified somewhat so that the integral hinge members are formed directly on the free edges of the panels.

Referring more specifically to the alternate forms of hinge assemblies 14, the embodiments disclosed in FIGURES 8 and 10 relate to an assembly wherein the hinge pins have been eliminated and the assembly is characterized by a pivotally interconnected pair of formed edges. The embodiment depicted in FIGURE 9 is generally similar to the embodiment disclosed in FIGURES 3–5, but differs from this form of hinge assembly in that the hinge members 14a and 14b are separately formed elements that are welded or otherwise integrally secured to the edge portions of the exterior skin 17.

More specifically, the embodiment disclosed in FIGURE 8 has the hinge members 14a and 14b formed as extensions of the upper and lower edges 17a and 17b of a pair of adjacent panels 12. However, in this embodiment, the formed hinge members are interconnected by a pivotal mating of the member 14a within the member 14b. The construction shown in FIGURE 10 is generally similar to that of the embodiment depicted in FIGURE 8; however, this latter embodiment differs from the former in that the sealing strip 26 has been eliminated and is replaced by a thin tape-like sealing member 26a. In the assemblies depicted in FIGURES 8 and 10, roller member support pins (not shown) are positioned in the region designated by the numeral 31 but do not extend across a major portion of the assembly as with the hinge pins 29. However, as with the hinge pins 29, the roller member support pins are preferably designed to be removably joined to the roller members and are removably positioned in the region 31 defined by the assemblies.

Referring to FIGURE 9, this embodiment of the hinge assembly 14 employs hinge members 14a and 14b that are integrally secured, (e.g. by welding or the like) to the inwardly extending edges of the exterior skins 17 of adjacent panels 12. This integrally added-on form of assembly also employs an additional form of sealing means to prevent heat loss between the mated edge portions of the interior and exterior skin surfaces 17 and 18. More specifically, a conventional form of sealing tape 32 is located at the junction points between the interior and exterior skins. It should be understood that this additional form of insulating means is also useable in conjunction with the other embodiments of the hinge assemblies 14 when desired for a given application.

From the foregoing it will be appreciated that the present invention provides an improved form of rollup door which is particularly suitable for use on trucks, trailers and other similar vehicles and the like. The door construction is characterized by high strength stemming from the employment of stressed skin laminated panels which also yield a relatively low weight construction. Moreover, the rollup door of the present invention provides a substantially weather-proof closure due to the use of the overlapped and insulated hinge assemblies 14 to join the individual panels 12.

Moreover, the hinge assemblies for the adjacent panels are recessed (i.e. confined between the panels joined thereby) and are not exposed at any time, even during the raising and lowering of the door. Accordingly, the construction of the present invention eliminates the possibility of damage either to the transported cargo or to an operator by projecting hinge elements. Furthermore, the integral nature of the individual hinge members which comprise the various forms of hinge assemblies 14 eliminates the necessity of utilizing numerous screws, rivets and/or other forms of hinge fastening means. This eliminates problems due to moisture leakage and structural failures which have been experienced when employing hinge assemblies that are fastened to the door panels in the conventional manner.

It will be appreciated that the foregoing description is merely illustrative of the invention. Various modifications of the aforedescribed embodiments might be devised by those skilled in the art without departing from the invention, various features of which are set forth in the accompanying claims.

What is claimed is:

1. A rollup door which comprises a plurality of door panels; mounting means for said door panels; and a plurality of pairs of rod elements; each of said door panels having a laminated construction and including a thin metallic skin forming an outer planar surface; a thin covering forming an inner planar surface and at least one layer of reinforcing material bonded therebetween; said outer metallic skin of each of said panels having an upper edge portion that constitutes an extension thereof and forms a plurality of spaced apart hinge eyes offset from the plane of said outer metal skin and a lower edge portion that constitutes an extension thereof and forms a plurality of spaced apart hinge eyes offset from the plane of said outer metal skin; said spaced apart hinge eyes formed by said upper and lower edge portions being selectively staggered such that said hinge eyes of immediately adjacent panels coact with a pair of rod elements to pivotally interconnect said panels and form a rollup door; said rod elements extending outwardly through said hinge eyes in opposite directions from the centralmost portion of said panels so that the inner ends of said rod elements are maintained in spaced relation to each other; the centralmost hinge eyes being cut-away and spaced apart from each other when said panels are joined so that said spaced apart inner ends of said rod elements are accessible and selectively removable from said hinge eyes through said cut-away portions without removing said door panels from said mounting means thereby facilitating the disassembly of said panels; said coacting hinge eyes and rod elements being maintained fully within the regions defined between the upper and lower edges of adjacent panels and between the outer and inner planar surfaces of said panels.

2. A rollup door in accordance with claim 1 and wherein said inwardly offset hinge eyes are formed with complementary irregularly shaped segments between the eye segment thereof and the segment thereof that is contiguous with the planar outer metal surface of said panel so as to form a sealing recess between the irregularly shaped segments of said mated hinge eyes and wherein sealing means are confined within said sealing recesses so as to form a weather-tight seal between each pair of adjacent panels forming said rollup door.

References Cited
UNITED STATES PATENTS

| | | | |
|---|---|---|---|
| 1,013,945 | 1/1912 | McCloud | 160—232 |
| 1,095,152 | 4/1914 | Volp | 160—235 |
| 1,872,652 | 8/1932 | Best | 160—232 |
| 2,134,397 | 10/1938 | Clark | 160—201 X |
| 2,494,001 | 1/1950 | Rowe | 160—229 |
| 2,563,549 | 8/1951 | Poggi | 160—235 |
| 2,739,730 | 3/1956 | Jonas | 160—235 X |
| 2,793,690 | 5/1957 | Stroup | 160—229 X |
| 3,113,401 | 12/1963 | Rose | 52—615 X |
| 3,126,589 | 3/1964 | Monti | 49—486 X |
| 3,198,242 | 8/1965 | Crosswell | 160—229 X |

DAVID J. WILLIAMOWSKY, *Primary Examiner.*

HARRISON R. MOSELEY, *Examiner.*

D. L. TAYLOR, *Assistant Examiner.*